United States Patent [19]

Murakami et al.

[11] 4,047,906

[45] Sept. 13, 1977

[54] METHOD FOR THE PURIFICATION OF WASTE GAS CONTAINING GASEOUS POLLUTANTS

[75] Inventors: Heiichiro Murakami; Tsuneo Okamoto, both of Iwaki, Japan

[73] Assignee: Taiyo Kaken Company, Ltd., Tokyo, Japan

[21] Appl. No.: 659,901

[22] Filed: Feb. 20, 1976

[30] Foreign Application Priority Data

Feb. 27, 1975 Japan .................................. 50-24262

[51] Int. Cl.² ............................................. B01D 53/12
[52] U.S. Cl. ...................................... 55/79; 23/288 S; 55/390; 252/417
[58] Field of Search ............ 23/270.5 T, 277 R, 284, 23/288 G, 288 S; 55/34, 60, 68, 79, 390, 479; 210/20, 189; 252/417; 423/449

[56] References Cited

U.S. PATENT DOCUMENTS

| 2,367,694 | 1/1945 | Snuggs | 55/79 X |
|---|---|---|---|
| 2,371,619 | 3/1945 | Hartley | 23/288 S X |
| 2,443,190 | 6/1948 | Krebs | 23/288 S X |
| 2,444,990 | 7/1948 | Hemminger | 23/288 S X |
| 2,664,967 | 1/1954 | Molstedt | 55/79 |
| 2,716,587 | 8/1955 | Hillard, Jr. | 23/288 S X |
| 3,786,134 | 1/1974 | Amagi et al. | 423/449 |
| 3,917,806 | 11/1975 | Amagi et al. | 423/449 |

FOREIGN PATENT DOCUMENTS 566,945  12/1932  Germany ........................ 23/270.5 T Primary Examiner—Wilbur L. Bascomb, Jr.
Assistant Examiner—Robert H. Spitzer
Attorney, Agent, or Firm—Lane, Aitken, Dunner & Ziems

[57] ABSTRACT

In a process for the purification treatment of a waste gas containing gaseous pollutants, including the steps of upwardly introducing the waste gas into the bottom of a tower a multiplicity of stepped trays and at the same time introducing an activated carbon into the top of the tower, allowing the waste gas and the activated carbon to come into contact to form a fluidized bed each on the stepped trays, thereby causing the gaseous pollutants in the waste gas to be adsorbed on the activated carbon the waste gas can be continuously purified by recycling the activated carbon spheres and adopting, as the stepped trays, perforated plates of a specific design.

19 Claims, 10 Drawing Figures

METHOD FOR THE PURIFICATION OF WASTE GAS CONTAINING GASEOUS POLLUTANTS

FIELD OF THE INVENTION

The present invention relates to a method for the purification of a gas containing noxious gaseous pollutants.

BACKGROUND OF THE INVENTION

Various chemical processes generate waste gases containing gaseous pollutants such as organic solvents which are harmful to the human system. From the standpoint of the prevention of air pollution, therefore, a waste gas containing such noxious gaseous pollutants must be freed of the noxious pollutants before it is released into the atmosphere.

Various methods for effecting purification of gases containing harmful gaseous pollutants by adsorption have been devised. As occasion requires, these prior methods involve recovery of the removed noxious pollutants. Of these prior methods, particularly popular is the method which makes use of the so-called fluidized-bed type adsorption system wherein a gas to be treated and adsorbent particles such as activated carbon, activated alumina or silica are brought into mutual contact to form a fluidized bed of the adsorbent particles. In the adsorption treatment of the gas by this fluidized-bed method, it is common practice to effect the gas treatment continuously by having fluidized beds formed in a multiplicity of stages within a tower as illustrated in FIG. 1 of the accompanying drawing, for example. In FIG. 1, 1 denotes a reaction tower. A gas containing noxious gaseous pollutants to be removed is introduced into the tower 1 through a nozzle 2 in the adsorption section A. On entering the tower interior, the gas ascends vertically and comes into contact with adsorbent particles held inside the adsorption section A, causing the adsorbent particles to form fluidized beds on the stepped trays 3, 3', 3" . . . The adsorbent particles forming the fluidized beds adsorb the gaseous pollutants from the gas. The gas which has thus been freed of the noxious pollutants is released into the atmosphere via a discharge outlet 4 at the top of the tower. The adsorbent particles on the stepped trays 3, 3', 3" . . . , fall through the downcommers 5, 5', 5" . . . associated with the trays and descend gradually downwardly by virtue of the gravity, while simultaneously adsorbing the gaseous pollutants from the gas. Then, they leave the adsorption section A and accumulate in the space formed on a funnel-shaped guide plate 6. While they form a gravitationally moving bed in the space, they gradually reach a regeneration section B which is located at the bottom of the reaction tower 1. On entering the regeneration section B, the adsorbent particles are heated by a heater 7, with the result that the particles are regenerated as they are forced by the heating to release the adsorbed pollutants. Subsequently, the regenerated adsorbent particles reaching the bottom 8 of the tower are transferred via a lifting pipe 9 to the top of the tower for recyclic service. In the meantime, the pollutents which have been desorbed from the adsorbent particles are forced out of the system via a nozzle 10 by means of a carrier gas being introduced via a nozzle 11 disposed at the lower portion of the regeneration section B. The discharged pollutents are transferred to a desorbate treating section C composed of a decanter and the like.

In the adsorption treatment of the gas by the fluidized-bed method described above, successful stabilization of the fluidized beds thus formed constitutes an essential requirement for enabling the removal of the noxious gaseous pollutants from the gas to be effected continuously at a high removal efficiency over long periods of service. The stability of such fluidized beds depends on the shape of adsorbent particles used, the strength, wear resistance and other physical properties of the particles and the flow volume, flow velocity and viscosity of the gas used for fluidizing the adsorent particles, and so on. It also depends on the extent of change in the weight of the adsorbent particles being recycled. When the adsorption treatment of gas by the conventional fluidized-bed type technique is reviewed from this point of view, it is noted that the so-called coconut-shell activated carbon obtained from coconut husks is popularly used as the adsorbent particles. The activated carbon of this type is made up of particles of varying, complicated shapes and therefore makes their transport substantially difficult. Moreover, the adsorbent particles have poor physical properties and, for this reason, are readily pulverized as by crushing and attrition. Recyclic use of such activated carbon particles of irregular shapes, therefore, involves numerous difficulties. In the adsorption treatment of gas by the fluidized-bed method, the adsorbent particles of such shapes induce undesirable phenomena such as boiling, channeling and slugging when fluidized by the upward flow of the gas under treatment. They also cause similar phenomena while they are moving downwardly via the downcommers (corresponding to the items denoted by 5, 5', 5" . . . in FIG. 1) by gravity, with the result that smooth flow of the particles inside the is impeded. This impeded flow consequently brings about a quantitative change in the weight of the adsorbent particles being transferred for recyclic service. With a view to precluding these disadvantageous phenomena, the conventional techniques have attempted to improve the structure of downcommers for the particles. It has been suggested, for example, to incorporate orifices in the bottoms of the downcommers or, as disclosed by U.S. Pat. No. 2,674,338, to have bottom plates supported on springs on the bottoms of the downcommers. These attempts at improvement of the structure of downcommers, however, effectively complicate the system itself and have the a disadvantage that activated carbon particles have their shapes vary gradually with the lapse of time. Thus, all these attempts fail to attain the preferred Stabilization of the quantitative transport of adsorbent particles. Because the adsorbent particles in use are highly susceptible to pulverization and also because stabilization of the transportation of these adsorbent particles is difficult to accomplish, the conventional techniques do not easily achieve stabilization of the fluidized beds of the adsorbent particles.

SUMMARY OF THE INVENTION

It is, therefore, a primary object of the present invention to provide a novel method for the purification of a waste gas by the fluidized-bed principal, which method, by recyclic use of activated carbon spheres, is capable of continuously and effectively purging the gaseous pollutants from the gas.

This object and other objects of the present invention will become apparent from the following description of the invention. It has now been discovered that the stabilization of the fluidized beds and the stabilization of the quantitative transport of activated carbon particles are both attained easily by using activated carbon spheres as the adsorbent particles and also using perforated plates of a specific shape as the stepped trays within the reaction tower.

According to the present invention, in the case in a reaction tower of which the adsorption section has a circular cross-section, there is provided a method for the purification of a waste gas, which method includes providing the interior of the reaction tower with two types of circular perforated plates alternately disposed in a vertical section. One type of plate is provided with an annular weir formed concentrically on the upper surface thereof in such a way that the plate is divided into a circular portion accounting for 80 to 95% of the entire surface area and an annular portion accounting for 5 to 20% of the entire surface respectively. The other type of plate is provided with an annular weir formed concentrically on the upper surface thereof in such a way that the plate is divided into a circular portion accounting for 5 to 20% of the entire surface area and an annular portion accounting for 80 to 95% of the entire surface area (with each type of plates, the surface area ratio between the two divided portions is the same for all plates). The gas to be subjected to treatment or the gas containing the gaseous pollutants is continuously introduced upwardly into the reaction tower from the bottom of the tower and at the same time activated carbon spheres are continuously fed into the top portion of the tower and the gas and the activated spheres are allowed to come into contact continuously to form fluidized beds of the activated carbon spheres on the stepped shelves of the perforated plates.

DETAILED DESCRIPTION OF THE INVENTION

Figure 1:
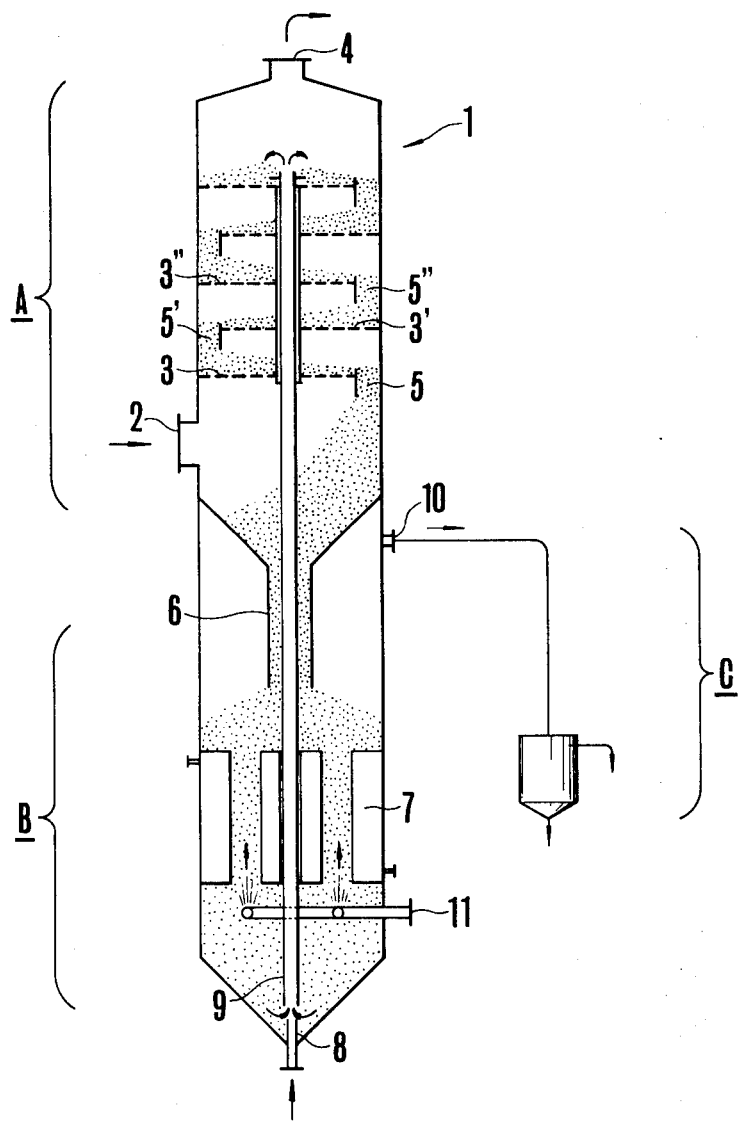
FIG. 1 is a schematic explanatory diagram illustrating one example of an adsorption apparatus for the removal of gaseous pollutants by the fluidized-bed principle.

In the method of the present invention, activated carbon spheres are used as the adsorbent particles. Because of their spherical shape, these activated carbon spheres offer the advantages of excellent fluidity, outstanding resistance to friction and wear and high impact strength. For the purpose of the present invention, the activated carbon spheres may be of the type which are obtained by mixing a powdery carbon or carbon precursor with a binding agent, subsequently molding the resultant mixture in the shape of spheres and activating the molded carbon spheres by a ordinary method (otherwise, referred to generally as "activated carbon spheres from caking coal"). It is, however, preferable to use the type of activated carbon spheres produced from a specific type of pitch as the raw material and by a specific method such as disclosed in U.S. Pat. No. 3,917,806, because the activated carbon spheres of this type are excellent in terms of their spherical shape and physical properties. The superiority of this type of activated carbon sphere over various other types of activated carbon particles is easily confirmed by subjecting samples of the various types of activated carbon to a friction test, then sifting the tested sample particles through a sieve of 200 mesh (by the Tyler standard) and comparing the weights of the corresponding sievings. To be specific, this comparison can be accomplished using glass containers measuring 28 mm in diameter and 220 mm in length, placing 20 cm$^3$ samples of the various types of activated carbon particles into the individual containers, rotating the containers and their contents at the rate of 36 r.p.m. for a fixed length of time, sifting the contents through a metal screen of 200 mesh and measuring the weight of the portion of each sample passing through the screen. The results of a typical experiment performed as described above are shown in Table 1 below.

Table 1

| | Extent of attrition loss of particles due to friction in dry state (wt%) | | | |
|---|---|---|---|---|
| | Length of friction test (in hours) | | | |
| Type of activated carbon | 10 | 20 | 30 | 40 |
| Activated carbon spheres disclosed in U.S. Pat. No. 3,917,806 | 0 | 0 | 0.05 | 0.05 |
| Activated carbon spheres from caking coal | 0.05 | 0.08 | 0.22 | 0.60 |
| Coconut-shell activated carbon | 2.3 | 2.9 | 3.3 | 3.5 |

For the purposes of the present invention, the activated carbon spheres are preferred to have a bulk density in the range of from 0.5 to 0.7 g/cm³, a particle diameter distribution range of from 0.2 to 2.0 mm and an average particle diameter in the range of from 0.4 to 1.2 mm. If the particle diameter distribution of these activated carbon spheres is excessively sharp, then during the actual use of the activated carbon spheres, the phenomenon known as channeling is induced. If the particle diameter distribution of the activated carbon spheres is excessively broad, then the actual use of such activated carbon spheres does not encounter the disadvantage described above but results in an adverse situation the spheres of larger diameters and those of smaller diameters become suspended at different positions in the bed. This leads to a condition wherein only spheres of smaller diameters flow over the weirs on the trays and descend down the interior of the tower. Such a partial movement of the spheres is contrary to the requirement that the spheres should be transferred stably in a constant weight. For this reason, the activated carbon spheres are preferred to have a particle diameter distribution such that the standard deviation of individual particle diameter distribution will fall in the range of from 0.05 to 0.20mm.

Figure 2:
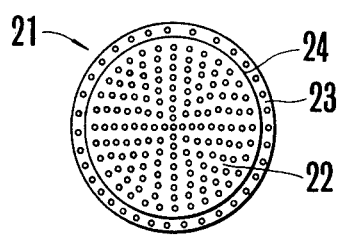
FIG. 2 is a plan view illustrating one preferred embodiment of one of the circular perforated plates of one of the two types of circular perforated plates used in the present invention, which circular perforated plate has a concentrically disposed annular weir formed on its upper surface in such a way that the plate surface is divided into a circular portion accounting for 80 to 95% of the entire surface area and an annular portion accounting for 5 to 20% of the entire surface area, respectively.
Figure 3:
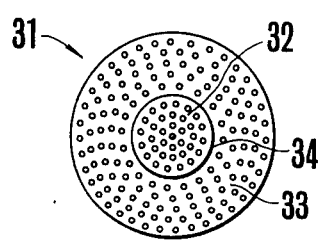
FIG. 3 is a plan view illustrating one preferred embodiment of the circular perforated plates of the other of the two types (inclusive of the type illustrated in FIG. 2) of circular perforated plates, which circular perforated plate has a concentrically annular weir formed on its upper surface in such a way that the plate surface is divided into a circular portion accounting for 5 to 20% of the entire surface area and an annular portion accounting for 80 to 95% of the entire surface area, respectively.
Figure 4:
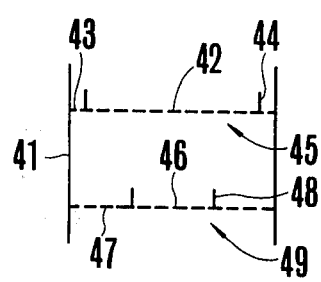
FIG. 4 is a schematic diagram illustrating a multiplicity of stepped trays having the circular perforated plates of the type of FIG. 2 and those of the type of FIG. 3 alternately disposed inside a cylinderical tower.
Figure 8:
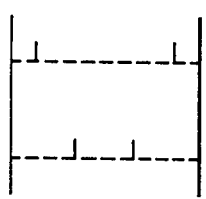
FIG. 8 is a schematic diagram illustrating a multiplicity of stepped trays formed of the rectangular perforated plates of FIG. 6 and those of FIG. 7 alternately disposed inside a rectangular tower.
Figure 5:
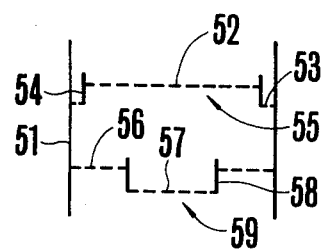
FIG. 5 is a schematic diagram illustrating alternative embodiments of the circular perforated plates of FIG. 2 and those of FIG. 3 alternately disposed inside a cylindrical tower.
Figure 9:
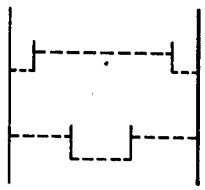
FIG. 9 is a schematic diagram illustrating a multiplicity of stepped shelves formed another embodiment of the rectangular perforated plates of FIG. 6 and FIG. 7 alternately disposed inside a rectangular tower.

The present invention may use, as the stepped shelves or trays mentioned above, circular perforated plates of a type having a concentrically annular weir on the upper surface. As illustrated in FIG. 2 of the accompanying drawing, the surface of the tray is divided by the weir into a circular portion accounting for 80 to 95% of the total surface area and an annular portion accounting for 5 to 20% of the total surface area. Another suitable tray is the circular perforated plate which is provided similarly on its upper surface with a concentrically annular weir, as illustrated in FIG. 3, so that the surface is divided into a circular portion accounting for 5 to 20% of the total surface area and an annular portion accounting for 80 to 95% of the total surface area. In FIG. 2, 21 denotes one such circular perforated plate. The upper surface of this circular perforated plate 21 is divided by a weir 24 into a first zone or a circular portion 22 and a second zone or annular portion 23. In FIG. 3, 31 denotes a circular perforated plate of another type. The upper surface of this circular perforated plate 31 is divided by a weir 34 into a first zone or circular portion 32 and a second zone or annular portion 33. The zone 22 of the plate of FIG. 2 and the zone 33 of the plate of FIG. 3 are the tray portions above which fluidized beds of activated carbon spheres are formed. The zone 23 of the plate of FIG. 2 and the zone 32 of the plate of FIG. 3 are the portions through which the activated carbon spheres descend to the next lower shelf. The weir 24 and the weir 34 are so disposed on their respective circular perforated plates that the zone 22 equals the zone 33 and the zone 23 equals the zone 32 respectively in surface area. The circular perforated plates 21 and 31 shown respectively in FIG. 2 and FIG. 3 are level along their entire surfaces and they each have multiplicity of perforations formed at an aperture ratio in the range of from 5 to 25%. The entire surfaces of the circular perforated plates 21 and 31 may be in one level plane as shown in FIGS. 4 and 8. Otherwise, the two zones of these plates may be in different horizontal planes separated by a vertical distance of 10 to 20 mm, as shown in FIGS. 5 and 9. When the plates are level throughout their entire surface, the perforations bored in the zones 22 and 33 have a diameter in the range of from 3 to 5 mm and those bored in the zones 23 and 32 are preferred to have a diameter about 1.5 to 2 times that of the perforations in the zones 22 and 33. When the plates have stepped horizontal surfaces, all the perforations bored therein may have a fixed diameter falling in the approximate range of from 3 to 5 mm. The heights of the weirs 24 and 34 are not specifically limited and are preferably in the range of from 20 to 60 mm. Moreover, it is indispensable to arrange the equiheight weirs on the respective plates for the purpose of stabilizing the fluidized beds of the activated carbon spheres and also stabilizing the transportation rate of the spheres. The superficial velocity of the gas in the tower is preferred from the practical point of view to fall in the range of 0.5 to 2.0 m/sec. in consideration of the fact that the inside diameter of the reaction tower is generally from 500 to 2,000 mm.

In the present invention, the circular perforated plates 21 and 31 are alternately disposed to form a multiplicity of stepped shelves inside a circular tower as shown in FIG. 4 or FIG. 5 and, thus forming an adsorption section into which the gas is introduced for purification. In FIG. 4, 41 denotes a cylindrical tower. Inside this tower 41, circular perforated plates 45, with surfaces divided by a concentrically annular weir 44 into circular portions 42 and annular portions 43, and circular perforated plates 40 with surfaces divided by a concentrically annular weir 48 into circular portions 46 and annular portions 47, are alternately disposed to form a multiplicity of stepped shelves. In FIG. 5, 51 denotes a cylindrical tower. Inside this cylindrical tower 51 are circular perforated plates 55, having surfaces divided by concentrically annular weirs 54 into circular portions 52 and annular portions 53. Each annular surface 53 is located in a level plane 10 to 20 mm below surface 52. Every other tray in tower 51 is a circular perforated plate 59 divided by a concentrically annular weir 58 into an annular portion 56 and circular portion 57 located a vertical distance of 10 to 20 mm below zone 56. The vertical distance by which two adjacent shelves are separated is generally expected to be approximately the sum of the height of the weir plus 60 mm. To effect the purification of gas in the reaction tower described above, one has only to feed the gas upwardly into the tower from the bottom and cause the introduced gas to come into counterflow contact with activated carbon spheres being introduced downwardly from the top, so that the activated carbon spheres are caused by the force of the flow of gas to form fluidized beds on the stepped shelves. The activated carbon spheres which have thus formed the fluidized beds on tray portions 42 and 47 are horizontally transferred in the direction of zone 43 and 46, and then descend by gravity through the perforations in the zones 43 and 46 of the circular perforated plates 45 and 49 in the tower of FIG. 4 (or the zones 53 and 57 of the circular perforated plates 55 and 59 in the tower of FIG. 5) as they adsorb the gaseous pollutants of the gas under treatment. After they have passed through the adsorption section formed by the multiplicity of stepped shelves, they are regenerated in the desorption and regeneration section. The regenerated activated carbon spheres are recycled, being again introduced downwardly into the reaction tower from the top. Before the activated carbon spheres forming the fluidized beds descend from one shelf to another, the individual activated carbon spheres on the stepped shelves move horizontally on the respective shelves. To be more specific, the activated carbon spheres which have fallen from the narrower portion (hereinafter referred to as "zone II") of a given shelf onto the wide portion (hereinafter referred to as "zone I") of the next lower shelf move to the zone II of the lower shelf as they form in situ a fluidized bed. The activated carbon spheres fed to the center area of zone 42 of the circular perforated plate 45 in the tower of FIG. 4, for example, are horizontally transferred in the direction of the zone 43 by the upward stream of the gas and gravitational attraction and then descend through the perforations distributed in the zone 43. Because the perforated plates used in the present invention as stepped shelves are circular in shape and they have their upper surfaces divided each by a concentrically annular weir into two zones, the invention enjoys the advantages enumerated in (1) through (3) below.

1. All the particles of activated carbon spheres falling on a circle having a given radius and sharing a common center with a perforated plate will travel equidistant horizontal distance. This means that the stabilization of the fluidized bed on each shelf is not disturbed by the movement of the activated carbon spheres suspended on that shelf.

2. The direction in which the horizontal transfer of individual activated carbon spheres occurs on the stepped shelves alternates from shelf to shelf and the heights of the fluidized beds on the respective stepped shelves are equal due to the weirs being of equal height. These facts make it possible to have the activated carbon spheres achieve steady transfer and uniform contact with the gas under treatment.

3. Each of the stepped shelves is divided into a portion for permitting downward flow of activated carbon spheres (zone II) and a portion for forming a fluidized bed of the spheres (zone I) and the area ratio of these two portions is constant. Therefore, by fixing the total aperture area in the zone I at a value falling in the range of from 4 to 20 times the total aperture area in the zone II, the weight of the spheres to be transferred can be stabilized with minimal deviation.

Figure 6:
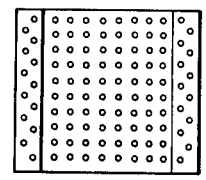
FIG. 6 is a plan view illustrating one preferred embodiment of one type of the rectangular perforated plates which, rectangular perforated plate is divided into two portions possessing surface areas at the same proportion as in the plate of FIG. 2.
Figure 7:
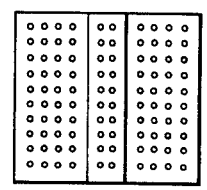
FIG. 7 is a plan view illustrating one preferred embodiment of the other type of rectangular perforated plates (inclusive of the type illustrated in FIG. 6), which rectangular perforated plate is divided into two portions having surface areas of the same proportions as the plate of FIG. 3.

The perforated plates to be used in the present invention are not required to be circular in shape, insofar as they satisfy the advantages of (1) through (3) described above. They may be of a rectangular shape as shown in FIG. 6 and FIG. 7, for example. Where a large system of a scale such that the reaction tower has an inside diameter exceeding 1,500 mm is used in the invention for some special reason, a slight inclination of the stepped shelves of not more than 2 degrees may possibly aid in the horizontal movement of activated carbon spheres on the stepped shelves. If the inside diameter of the reaction tower is small, however, such an inclination may conversely result in an increased variation in the volume of activated carbon spheres transferred. The desirability such an inclination, therefore, should be evaluated with due respect paid to the inside diameter of the reaction tower.

By the fact that activated carbon spheres are used as the adsorbent particles and perforated plates of a specific shape are used as stepped shelves as described above, the present invention enables the fluidized beds formed on the stepped shelves to be stabilized to a height equalling the height of the weirs disposed on the stepped shelves and, furthermore, permits the variation in the weight of activated carbon spheres being transferred to be limited within ± 10% by weight without resorting to any auxiliary device. Thus, the invention enables the purification of the waste gas to be carried out continuously for a long period of time of more than 200 hours, for example, with the efficiency of removal of the gaseous pollutants kept at high level (far exceeding 80%). The gas which has been purified can be released into the atmosphere without further treatment from the top portion of the reaction tower. The present invention also serves the purpose of simplifying the system itself, because it obviates the necessity of providing the stepped shelves with downcommers as in conventional techiques.

Now, the present invention will be described more specifically below with reference to preferred embodiments. It should be noted that the present invention is not limited in any way to these examples.

EXAMPLE 1

Rectangular perforated plates were fabricated each by joining a rectangular perforated plate measuring 20 cm × 10 cm and containing perforations 5 mm in diameter to an aperture ratio of 17.9% and a rectangular perforated plate measuring 20 cm × 90 cm and containing perforations 4 mm in diameter to an aperture ratio of 17.9% along their respective 20-cm sides and placing a weir in the form of a flat plate 20 mm in height along the joint so that the respective zones had an aperture area ratio of 1 : 9. The zones containing the perforations 5 mm in diameter formed zones II which permit downward flow of activated carbon spheres. A box-type fluidized bed test apparatus was made by disposing four of such shelves in such a way that the horizontal direction of the movement of activated carbon spheres would alternate as they descended from shelf to shelf. Activated carbon spheres were fed downwardly into the uppermost shelf at a rate of 40 kg/hour and dry air was introduced upwardly below the lowermost shelf at a superficial tower velocity of 1 m/sec. to fluidize the spheres. The activated carbon spheres were of the type having an average particle diameter of 0.7 mm and a particle diameter distribution range of 0.2 mm to 2.0 mm. During a total of two hours of continued operation, the weight of activated carbon spheres which flowed out of the tower in 2 minutes (average retention time of activated carbon spheres per shelf in the apparatus of the present case) was measured at a total of ten randomly selected points of time. The ten values thus obtained averaged 1.33 kg and the difference between the largest and smallest of the ten values was 0.12 kg.

For the purpose of comparison, rectangular preforated plates were fabricated with a square plate measuring 20 cm × 20 cm and containing perforations 5 mm in diameter, an aperture ratio of 24%, joined to a rectangular plate measuring 20 cm × 80 cm and containing perforations 4 mm in diameter, in an aperture ratio of 17.9%. The plates were joined to each other along their respective 20-cm sides and a flat plate weir 20 mm in height was disposed along the joint so that the respective zones had an aperture area ratio of 1 : 3. The square zones II permitted downward flow of activated carbon spheres. A fluidized bed test apparatus was made by disposing such shelves in a total of four steps in the same way as above. By using this apparatus, the experiment described above was repeated under the same conditions. The average of the values per shelf was 1.28 kg and the difference between the largest and smallest of the values was 0.31 kg. The operation was further continued, without alteration, and the weight of activated carbon spheres which flowed out of the tower over a period of time of eight minutes (average retention time of activated carbon per tower in the apparatus of this case) was measured three times at intervals of 20 minutes. The values were 5.8 kg, 5.4 kg and 6.7 kg, indicating that the rate of transport of the spheres was not stable.

To adapt the above test apparatus for the present invention, about half of the perforations contained in the (zone II), permitting downward flow of spheres, in all the perforated plates were closed with adhesive tape. The same operation was repeated. The amount of activated carbon spheres which flowed out of the tower over a fixed period of two minutes was measured four times during a period of 30 minutes. In this case, the difference between the largest and smallest of the values per shelf was 0.15 kg. In the continued operation, the amount of spheres which flowed out over a fixed period of 8 minutes was measured three times at intervals of 30 minutes. The values per tower were 5.3 kg, 5.4 kg and 5.1 kg, indicating that the closure of half of the perforations served to stabilize the transportation of spheres.

By following the procedure described above, the flow amount of spheres for the average retention time (per shelf) and the flow amount of spheres for the average retention time (per tower) were measured for various aperture area ratios. The results were as shown in Table 2 below.

Table 2

| Aperture area ratio between zone for downward flow and zone for fluidized bed | Flow amount during retention time per shelf | | Flow amount during retention time per tower | |
|---|---|---|---|---|
| | Average | Difference | Average | Difference |
| 1/3 | 1.28 kg | 0.31 | 6.0 kg | 1.3 |
| 1/4 | 1.24 kg | 0.27 | 5.6 kg | 0.9 |
| 1/6 | — | — | 5.3 kg | 0.3 |
| 1/10 | 1.33 kg | 0.12 | — | — |
| 1/10 | 1.33 kg | 0.18 | 5.7 kg | 0.2 |
| 1/12 | 1.25 kg | 0.15 | 5.7 kg | 0.9 |
| 1/12 | — | — | 5.4 kg | 0.3 |
| 1/18 | 1.31 kg | 0.20 | — | — |
| 1/20 | 1.28 kg | 0.15 | 5.3 kg | 0.3 |
| 1/24 | — | — | 5.0 kg | 1.2 |

From the above results, it was concluded that the transportation of activated carbon spheres could be stabilized to within 10% by weight where the aperture area of the zone I was in the range of from 4 to 20 times the aperture area of the zone II.

EXAMPLE 2

1. In the test apparatus of Example 1 which had an aperture area ratio of 9:1, the experiment was performed with the superficial-tower gas velocity varied to 4° of 0.6 m/sec, 0.8 m/sec, 1.0 m/sec and 1.2 m/sec and the recirculation rate of spheres to three values of 20 kg/hr, 40 kg/hr and 50 kg/hr to determine changes in the pressure drop across the entire tower. It was found that under all the conditions, the pressure drop remained constant at a value of 40 mm of water. Under all the conditions, the variation in the water level in the manometer was very slight, on the order of about 5 mm.

2. To permit spheres from each of the stepped shelves of this test apparatus, the zones of the plates permitting downward flow of spheres were disposed at levels 20 mm lower than those of the other zones supporting the fluidized beds and were each provided with a sampling port. Colored spheres prepared by spraying activated carbon spheres with a white paint were fed for a moment into the tower. Then, samples from the various shelves were examined to determine the time-course change of the density of colored spheres in the samples. In all the shelves, the intervals from the time the colored spheres were introduced to the time the density of colored spheres in the samples reached its peak were invariably in the range of from 90 to 100 seconds. This means that the average speed of movement of spheres in the horizontal direction was equal for all shelves and, therefore, the fluidized beds of spheres were so stable as to have equal average retention times.

It was further observed that the downward flow of spheres was extremely stable where the zones of the plates for downward flow of spheres (zone II) were at levels lower than those zones supporting the fluidized beds (zone I).

EXAMPLE 3

In a cylindrical glass column, measuring 600 mm in inside diameter and 400 mm in height, a pipe of stainless steel measuring 30 mm in outside diameter was entrally disposed. This pipe was used for conducting a current of air to recirculate regenerated activated carbon spheres. A fluidized bed test apparatus was fabricated by disposing perforated plates of stainless steel containing perforations 3.5 mm in diameter to an aperture ratio of 17.5% at a total of six levels inside the glass column, with the pipe serving as a support bar. In this test apparatus, an experiment was carried out to determine the stability of fluidized beds and the stability of the rate of transfer of spheres.

The preferred plate disposed at the uppermost level of this apparatus was a two-level structure wherein the zone II for permitting downward flow of spheres, i.e. the portion of the perforated plate in the shape of an annulus 25 mm in breadth, was disposed along the inner wall of the glass cylinder and was joined, at its inside edge, to the lower end of a cylindrical weir which was disposed on the circumference of zone I for support of the fluidized bed of spheres, i.e. the portion of the perforated plate in the shape of a circular plane 550 mm in diameter. The weir, disposed as described above, serving to separate the zones I and II; had a height of 15 mm in zone I and a height of 25 mm in zone II, respectively. Perforated plates of the same structure were used also in the third and fifth levels in descending order.

The perforated plates disposed at the second and following even-numbered levels were each of a two-level structure wherein the zone II for permitting downward flow of spheres, was in the form of a perforated plate having the shape of a circular plane 235 mm in diameter concentric with the air-current lifting pipe. Each section II zone was joined by a cylindrical weir having a height of 25 mm and disposed around the circumference of the zone II, to the zone I section, disposed outside the periphery of the weir. In a fashion similar to the uppermost plate, the two zones were joined to the weir at such relative heights that the surface of the zone I was 10 mm higher than that of the zone II. In each of the perforated plates disposed at the size levels, the area ratio of the zone I to the zone II was constant at 85 : 15. The two types of two-level perforated plates were disposed at equal vertical intervals of 70 mm.

In the test apparatus of the foregoing description, activated carbon spheres having the same particle diameter distribution as those used in Example 1 were continuously fed via the lifting pipe onto the perforated plate at the uppermost level at a rate of 55 kg/hour. Dry air was upwardly introduced beneath the lowest plate at a flow volume of 814 m$^3$/hour to produce an ascending air current at a superficial column velocity of 0.8 m/sec, thus fluidizing the activated carbon spheres. It was observed that, on lapse of 15 minutes from the start of the operation, the fluidized beds of spheres on all the shelves were stabilized and assumed a constant state. After this steady state was achieved, the weight of activated carbon spheres which fell off the lowermost shelf over a period of two minutes was measured at a total of ten randomly selected points of time during a period of 2½ hours. the ten values averaged 1.82 kg and the difference between the largest and smallest of the values was only 0.3 kg. Under the same conditions, the operation was further continued and after 30 hours, the amount of spheres exiting over two minutes was measured eight times during the following two hour time period hours. The average of the values was 1.83 kg and the difference between the largest and smallest of these values was 0.4 kg.

With regard to the condition of the fluidized beds of spheres formed on the different levels, all the fluidized beds were in a perfectly stable state, except that the surface rippling of the fluidized bed at the uppermost level was more conspicuous than at the remaining levels probably because the amount of spheres fed via the lifting pipe fluctuated to some extent. The turbulence of the fluidized bed which could be expected to occur when the feeding of spheres was suspended and subsequently restarted was hardly observed. It was virtually safe to conclude that the fluidized bed was brought to a perfect steady state within two minutes of the starting of the feeding of spheres. The apparatus was thus confirmed as providing extremely stable fluidized beds.

EXAMPLE 4

Figure 10:
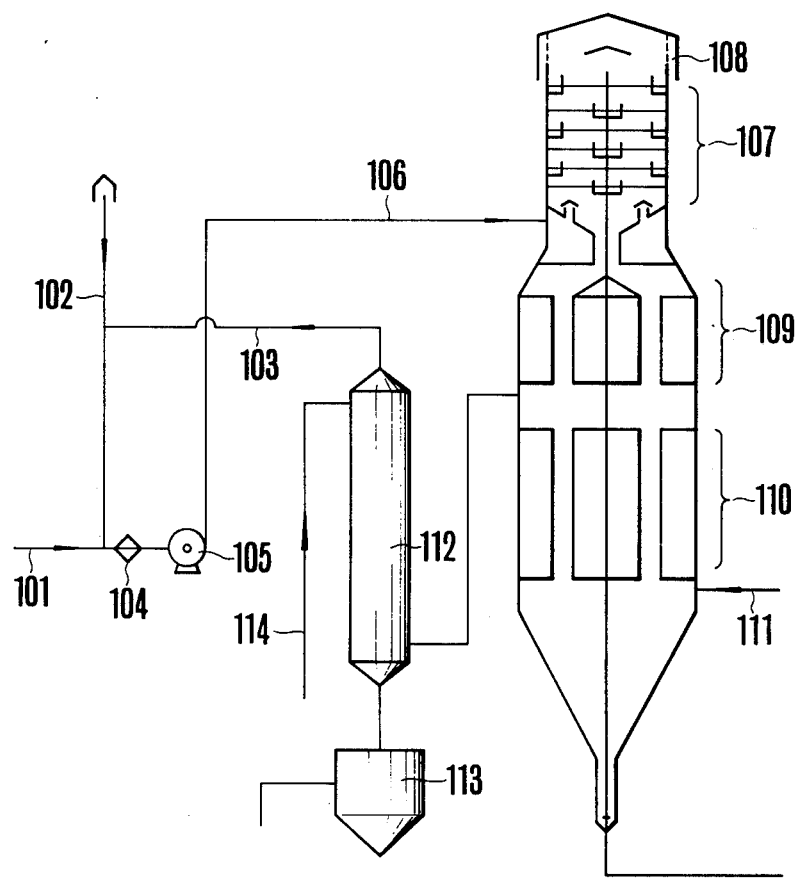
FIG. 10 is a schematic diagram illustrating one preferred embodiment of the present invention in which a gas containing gaseous pollutants is treated continuously for the removal of the gaseous pollutants.

A fluidized-bed adsorption section consisting of six stepped shelves in accordance with the present invention, as shown in Example 3, was disposed in the upper part of a tower and a mobile bed-preheating section (having a heat transfer area of 6.4 m$^2$) and a mobile bed-desorbing section (having a heat transfer area of 9.7 m$^2$) were disposed in a single reaction tower (measuring 5.4 m in overall height, 640 mm in tower diameter at the adsorption section and 840 mm in tower diameter at the preheating and desorbing sections). A system as shown in FIG. 10 was completed by disposing an air-current lifting pipe along the axis of the tower to permit delivery of regenerated activated carbon spheres to the adsorption section. By use of this system, perchloroethylene was continuously recovered from the waste gas of a washing plant.

In the diagram of FIG. 10, 101 designates the raw waste gas, 102 a diluting carrier gas, 103 the gas which has passed the condenser, 104 a strainer, 105 a blower, 106 the gas to be treated, 107 the adsorption section, 108 an outlet for discharging the purified gas, 109 the preheating section, 110 the desorbing and regenerating section, 111 the desorbing carrier gas, 112 a condenser, 113 a separator and 114 the cooling water. For treatment in the adsorption section, a mixed gas consisting of the raw waste gas, the diluting carrier gas (air) and the gas (air) containing the residual perchloroethylene which had flowed through the condenser and therefore was equivalent to the partial pressure at the condenser temperature (20° C) was introduced into the adsorption section. Prior to this introduction, the mixed gas subjected to treatment was diluted with air to have its perchloroethylene concentration adjusted to 6,000 ppm. This mixed gas was introduced at a flow volume rate of 890 Nm$^3$/hour, for superficial tower velocity of 0.8 m/sec. in the adsorption section, and activated carbon spheres of the same description as those used in Example 1 were recirculated at a rate of 110 kg/hour. The continuous recovery of perchloroethylene from the gas was continued, with the desorbing section maintained at 140° C and the flow volume of the desorbing carrier gas (steam) fixed at 36 Nm$^3$/hour. Consequently, the purified gas which had passed through the adsorption section and was released into the atmosphere was found to have a perchloroethylene concentration of less than 30 ppm. The recovery of perchloroethylene was obtained at a rate of 33.6 kg/hour.

Under the conditions described above, the system was operated continuously for ten hours daily during a period of two months (actual operation time amounting to 500 hours) and a period of six months (actual operation time amounting to 1,500 hours). At the outset of the operation, 300 kg of activated carbon spheres were fed to the system and were not replenished at all at any time during the continued operation. Throughout the test period, the aforementioned rates of adsorption and removal were maintained and the amount of perchloroethylene recovery varied very little. activated carbon spheres and that of the same spheres regenerated after 500 hours' and 1,500 hours' operation were compared. The results are shown in Table 3 below. The results indicate virtually no decline in the adsorbing capacity of the activated carbon spheres.

Table 3

| | Amount of residue, perchloroethylene (g) /activated carbon (g) | Amount of adsorption, perchloroethylene (g) /activated carbon (g) |
|---|---|---|
| Activated carbon spheres before operation | 0 | 0.68 |
| Activated carbon spheres regenerated after 500 hours' operation | 0.06 | 0.60 |
| Activated carbon spheres regenerated after 1,500 hours' operation | 0.06 | 0.63 |

Separately, when the activated carbon spheres regenerated after 1,500 hours' operation were sampled for the adsorption test, part of the sample was subjected to a test for frictional disintegration. In this test, practically no disintegration was observed to occur in the regenerated spheres similar to the results given in Table 1. When a given amount of these regenerated spheres was weighed, an increase of about 7% by weight was noted over the weight of the corresponding spheres prior to use. In consideration of the increase in the residue from desorption, it was inferred that there was substantially no loss of weight during use.

What is claimed is:

1. A method for the continuous purification of a waste gas containing gaseous pollutants, comprising the steps of:

providing a tower having an absorbing section containing a plurality of vertically spaced trays, said trays being of two types, alternately arranged, a first type of said trays having at least one weir provided on its surface disposed to divide its surface area into a central zone I and a distal zone II, said central zone I having 80-95% of the total surface area of said first type tray, both of said zones being provided with a plurality of apertures, the total area of the apparatus of said central zone I equaling 4-20 times the total area of apertures in said distal zone II, the second type of tray being provided with at least one weir disposed to divide the tray into a central zone II and a distal zone I, said central zone II having 5-20% of the total surface area of said second type tray, both zones of second type tray being provided with a plurality of apertures, the total aperture area of said distal zone I equaling 4-20 times that of the total aperture area of said central zone II, the weir provided on said first type of tray and the weir provided on said second type of tray being equal in height;

continually introducing the gas to be purified into a lower section of the tower beneath said adsorption section;

continuously feeding activated carbon spheres onto the top tray of said tower, said carbon spheres and said gas coming into countercurrent contact, said carbon spheres forming a fluidized bed in zone I of each tray and descending through zone II to the next lower tray; and continuously removing purified gas from the top of said tower.

2. The method of claim 1, wherein the apertures of each tray constitute 5-25% of the total tray area.

3. The method of claim 2, wherein said trays are stepped with the zone II of each tray on a level 10-20 mm below the zone I, and wherein said apertures have a diameter in the range of from 3-5 mm.

4. The method of claim 2, wherein the central and distal sections of each tray are in the same horizontal plane and wherein the diameter of the apertures in the zone II is 1.5 to 2 times that of the diameter of the apertures in the zone I.

5. The method of claim 1, wherein the height of the weirs is in the range of from 20-60 mm.

6. The method of claim 1, wherein said gas is introduced into said tower at a superficial tower velocity in the range of from 0.5 to 2.0 m/sec.

7. The method of claim 1, wherein said activated carbon spheres have a particle diameter distribution range of from 0.2 to 2.0 mm, an average particle diameter in the range of from 0.5 to 1.2 mm and a bulk density of from 0.5 to 0.7 g/cm².

8. The method of claim 1, wherein said activated carbon spheres are produced by fusing pitch, molding the fused pitch into spheres and subjecting the resultant pitch spheres to the treatment of infusibilization, carbonization, and activation.

9. The method of claim 1, wherein said activated carbon spheres exiting the lowermost tray are regenerated and recycled to the uppermost tray.

10. A method for the continuous purification of a waste gas containing gaseous pollutants, comprising the steps of:

providing a tower having an adsorbing section containing a plurality of vertically spaced trays, each of said trays being divided by at least one weir into first and second zones, each zone having a plurality of apertures, each first zone having 80-95% of the total surface area of the tray and a total aperture area 4-20 times the total aperture area in said second zone, continually introducing the gas to be purified into a lower section of the tower beneath said adsorption section;

continuously feeding activated carbon spheres onto the top tray of said tower, said carbon spheres and said gas coming into countercurrent contact, said carbon forming a fluidized bed in said first zone of each tray and descending through said second zone to the next lower tray; and continuously removing purified gas from the top of said tower.

11. A chemical process column containing a plurality of vertically spaced trays, said trays being of two types, alternately arranged, a first type of said trays having at least one weir provided on its surface disposed to divide its surface area into a central zone I and a distal zone II, said central zone I having 80-95% of the total surface area of said first type tray, both said first tray sections being provided with a plurality of apertures, the total area of the apertures of said central zone I equaling 4-20 times the total area of apertures in said distal zone II, the second type of tray being provided with at least one weir disposed to divide the tray into a central zone II and a distal zone I, said central zone II having 5-20% of the total surface area of said second type tray, both zones of said second type tray being provided with a plurality of apertures, the total aperture area of said distal zone I equaling 4-20 times that of the total aperture area of said central zone II, the weir provided on said first type of tray and the weir provided on said second type of tray being equal in height.

12. The column of claim 11, wherein the apertures of each tray constitute 5-25% of the total tray area.

13. The column of claim 12, wherein said trays are stepped with the zone II of each tray on a level 10-20 mm below that of the zone I, and wherein said apertures have a diameter in the range of from 3-5 mm.

14. The column of claim 11, wherein the central and distal zones of each tray are in the same horizontal plane and wherein the diameter of the apertures in the zone II is 1.5 to 2 times that of the diameter of the apertures in the zone I.

15. The process column of claim 11 wherein said trays are rectangular in shape, each tray having two weirs provided on its upper surface, said weirs on said first type of tray being disposed adjacent opposite walls of said column to define a central zone I and two distal zones II.

16. The column of claim 15 wherein said trays are stepped with the distal zones II of said first type of tray being on a lower level than that of the central zone I.

17. The process column of claim 11 wherein said trays and said weirs are circular in shape.

18. The process column of claim 17 wherein said trays are stepped with the central and distal zones of a given tray being on different levels.

19. The chemical process column of claim 11, wherein the apertures of each zone II have diameters of 1 to 2 times the diameters of the apertures in the zone I of the same tray.

* * * * *

UNITED STATES PATENT AND TRADEMARK OFFICE
CERTIFICATE OF CORRECTION

PATENT NO. : 4,047,906
DATED : September 13, 1977
INVENTOR(S) : MURAKAMI ET AL

It is certified that error appears in the above-identified patent and that said Letters Patent are hereby corrected as shown below:

Column 1, line 68, before "decanter" insert --condenser,--.
Column 2, line 11, "adsorent" should read --adsorbent--;
          line 34, before "is" insert --downcommers--;
          line 47, delete "a";
Column 4, line 19, "formed" should read --form--;
          line 41, "a" should read --an--.
Column 5, line 24, after "situation" insert --wherein--.
Column 7, line 68, after "desirability" insert --of giving--.
Column 9, line 14, after "carbon" insert --spheres--.
Column 10, line 5, after "permit" insert --sampling of--;
           line 32, "entrally" should read --centrally--;
           line 43, delete "preferred" and insert --perforated--.
Column 11, line 4, delete "size" and insert --six--;
           line 29, delete "hours";
Column 12, line 38, before "activated" insert --The Perchloroethylene adsorbing capacity of fresh--.
Column 13, line 17, delete "apparatus" and insert --apertures--.

Signed and Sealed this

Twenty-first Day of February 1978

[SEAL]

Attest:

RUTH C. MASON
Attesting Officer

LUTRELLE F. PARKER
Acting Commissioner of Patents and Trademarks